(12) United States Patent
Szabo

(10) Patent No.: US 10,508,630 B2
(45) Date of Patent: Dec. 17, 2019

(54) FUEL PUMP ASSEMBLY

(71) Applicant: Robert Bosch GmbH, Stuttgart (DE)

(72) Inventor: Tamas Szabo, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 15/534,020

(22) PCT Filed: Sep. 7, 2015

(86) PCT No.: PCT/EP2015/070394
§ 371 (c)(1),
(2) Date: Jun. 8, 2017

(87) PCT Pub. No.: WO2016/091409
PCT Pub. Date: Jun. 16, 2016

(65) Prior Publication Data
US 2018/0335004 A1 Nov. 22, 2018

(51) Int. Cl.
*F02M 37/22* (2019.01)
*B01D 35/00* (2006.01)
(Continued)

(52) U.S. Cl.
CPC .......... *F02M 37/22* (2013.01); *B01D 35/005* (2013.01); *B01D 35/027* (2013.01); *B62J 37/00* (2013.01);
(Continued)

(58) Field of Classification Search
None
See application file for complete search history.

(56) References Cited

U.S. PATENT DOCUMENTS 3,707,202 A * 12/1972 Dixon ................ B01D 35/0273
123/196 A
6,858,134 B2 * 2/2005 Yates ..................... B01D 29/21
210/167.01
(Continued)

FOREIGN PATENT DOCUMENTS

CN           1495355 A      5/2004
CN      103899456 A      7/2014
(Continued)

OTHER PUBLICATIONS

International Search Report for Application No. PCT/EP2015/070394 dated Dec. 8, 2015 (English Translation, 2 pages).

*Primary Examiner* — Benjamin M Kurtz
(74) *Attorney, Agent, or Firm* — Michael Best & Friedrich LLP

(57) ABSTRACT

The invention relates to a fuel pump assembly, which comprises a fuel pump (2), a fuel tank (3), in which the fuel pump (2) is at least partially arranged, an intermediate component (4), which is arranged on the outside of the fuel tank (3) and has a fuel connection to the fuel tank (3), and a filter (5), which is arranged in a filter chamber (6) and is arranged on the outside of the intermediate component (4) or the fuel pump (2). According to the invention, a fuel flow flows from an interior (30) of the fuel tank (3) through a first opening (40) of the intermediate component (4) outward into the filter chamber (6) and from the filter chamber (6) through the filter (5) and through a second opening (41) of the intermediate component (4) to an inlet (20) of the fuel pump (2).

17 Claims, 1 Drawing Sheet

(51) Int. Cl.
  *B01D 35/027*   (2006.01)
  *F02M 37/00*    (2006.01)
  *B62J 37/00*    (2006.01)
  *B62J 35/00*    (2006.01)
  *F02M 37/10*    (2006.01)
  *B01D 35/26*    (2006.01)
  *F02M 37/14*    (2006.01)
  *F02M 37/04*    (2006.01)

(52) U.S. Cl.
  CPC .... *F02M 37/0023* (2013.01); *F02M 37/0076* (2013.01); *F02M 37/04* (2013.01); *B01D 2201/167* (2013.01); *B62J 35/00* (2013.01)

(56) References Cited

U.S. PATENT DOCUMENTS

| | | | |
|---|---|---|---|
| 2003/0155287 A1* | 8/2003 | Osborn | B01D 35/027 210/172.1 |
| 2003/0183564 A1* | 10/2003 | Nguyen | B01D 29/21 210/167.08 |
| 2009/0000844 A1 | 1/2009 | Castillo et al. | |

FOREIGN PATENT DOCUMENTS

| | | |
|---|---|---|
| DE | 112012005061 | 8/2014 |
| JP | S60140606 U | 9/1985 |
| JP | 2004060597 A | 2/2004 |
| JP | 2008261293 A | 10/2008 |
| JP | 2011032898 A | 2/2011 |
| JP | 2013181462 A | 9/2013 |
| WO | 2007089852 | 8/2007 |
| WO | 2013180099 | 12/2013 |

\* cited by examiner

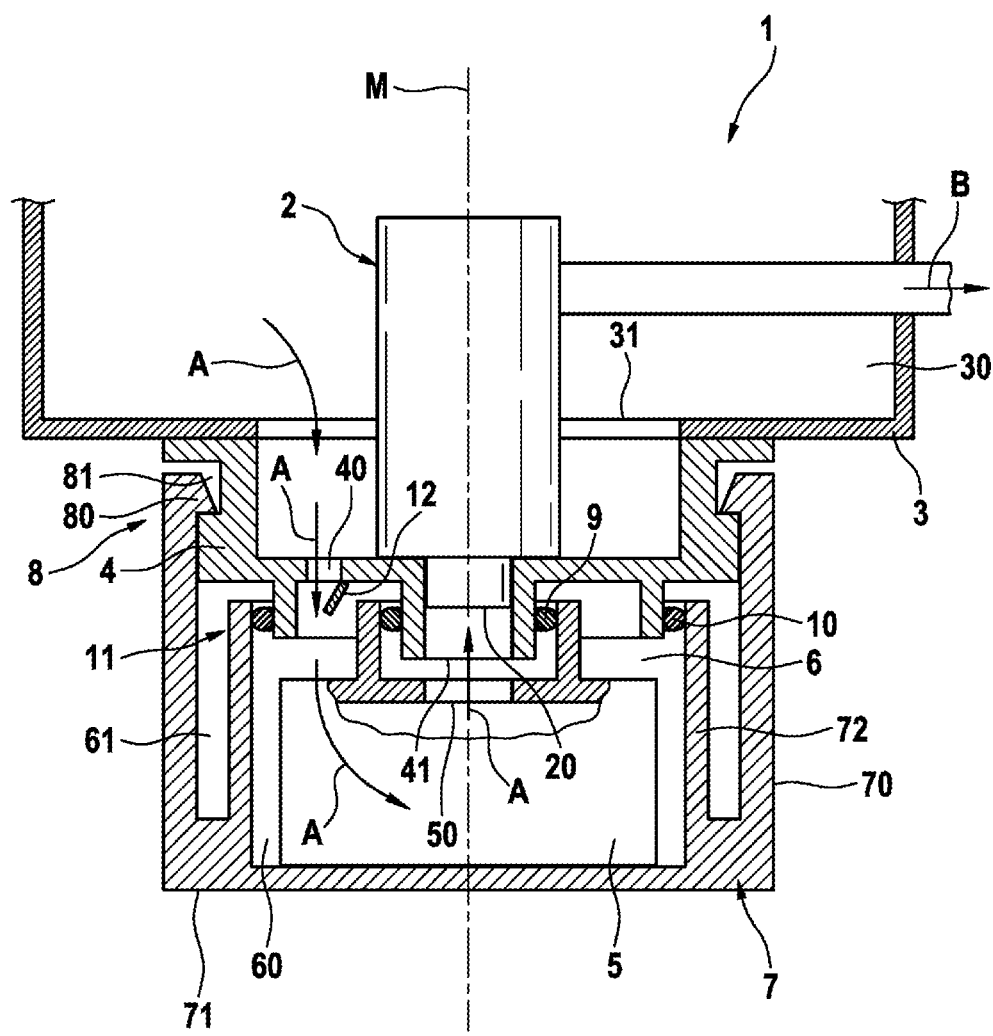

FUEL PUMP ASSEMBLY

BACKGROUND OF THE INVENTION

The present invention relates to a fuel pump assembly having a fuel pump, in particular for motorcycles, and to a fuel tank.

In previously known fuel assemblies, a filter is used to filter the fuel. In particular, the filter is arranged either in the fuel tank on the fuel pump, or outside the fuel tank with a hose for connecting the filter to the fuel pump. However, both of these assemblies have the disadvantage that exchanging the filter is a complex operation. Thus, either the entire fuel assembly has to be disassembled to remove the filter from the fuel tank, or the hose connections must be detached or removed.

SUMMARY OF THE INVENTION

In contrast, the fuel pump assembly according to the invention, has the advantage that fitting and removal of a filter for a fuel pump is made significantly easier. Thus, cleaning or exchange of the filter is simplified. As a result, the associated costs are also considerably reduced. According to the invention, this is achieved by bringing the filter element into direct contact with the fuel pump or with an intermediate component, arranged on a fuel tank, outside the fuel tank. Here, the fuel pump assembly according to the invention comprises a fuel pump, a fuel tank, in which the fuel pump is at least partially arranged, an intermediate component, which is arranged on the outside of the fuel tank and has a fuel connection to the fuel tank, and a filter, which is arranged in a filter chamber. According to the invention, the filter is arranged on the outside of the intermediate component or the fuel pump, wherein a fuel flow flows from an interior of the fuel tank through a first opening of the intermediate component outward into the filter chamber and from the filter chamber through the filter and a second opening of the intermediate component to an inlet of the fuel pump. As a particular preference, the fuel pump is arranged completely in the fuel tank, wherein the filter is arranged on the intermediate component. The presence of the intermediate component has the advantage that the intermediate component can be matched to customer-specific requirements, while the filter and the fuel pump can be produced in a standardized way.

As an alternative, the fuel tank and the intermediate component can preferably be of integral design. The fuel tank and the intermediate component can be produced at low cost as an injection molding, for example. Moreover, potential sealing problems between the fuel tank and the intermediate component can be avoided by means of an integral construction.

As a further preference, the fuel pump can furthermore comprise a holding element, wherein the filter is held exchangeably on the intermediate component by the holding element, and the holding element defines the filter chamber. Thus, the filter can be fastened detachably on the intermediate component. In addition to the holding function, the holding element defines the filter chamber, in which the filter is arranged and which the fuel from the fuel tank enters before being fed into the fuel pump. A compact construction is thereby made possible.

According to an advantageous embodiment of the present invention, the holding element is of substantially pot-shaped design, having a wall region and the bottom region, wherein the filter is supported on the bottom region of the holding element. Here, a cavity of the pot-shaped holding element corresponds to the filter chamber.

As a further preference, the fuel pump assembly can comprise a detachable connection, in particular a latching connection, between the holding element and the intermediate component. Thus, a quickly established and reliable connection between the holding element and the intermediate component is made possible. Once the holding element has been removed from the intermediate component, there is easy access to the filter. In particular, the holding element has at least one latching hook, which is arranged in such a way that it can be latched into at least one groove of the intermediate component. The latching hook can be formed on the holding element so as to encircle the latter, wherein the latching hook is arranged in such a way that it can be latched into a groove formed around the outer circumference of the intermediate component.

A first sealing element is advantageously arranged between the filter and the intermediate component. Thus, leaktightness between the filter and the intermediate component is ensured, thus preventing fuel that has already been filtered from reentering the filter chamber. Thus, continuous delivery of fuel by the fuel pump without dips in the delivery quantity is made possible.

It is furthermore advantageous if a second sealing element is arranged between the filter and the holding element. In this way, leaktightness between the filter and the holding element is ensured, thus preventing fuel from escaping into the environment of the fuel pump assembly. Failsafe operation of the fuel pump is thereby furthermore ensured.

As an alternative or in addition, the holding element can have a sealing device. This sealing device can preferably comprise an intermediate wall region formed in an encircling manner in the filter chamber, which intermediate wall region is spaced apart from a wall region of the holding element and divides the filter chamber into a first subchamber and a second subchamber. The intermediate wall region is arranged in such a way that the second subchamber is of smaller design than the first subchamber, wherein the filter is situated in the first subchamber. Thus, fuel which is not drawn in by the fuel pump can enter the second subchamber. The presence of the intermediate wall region reduces the pressure of the fuel which is not drawn in, thereby preventing the fuel from escaping into the environment. If there is a sealing element between the filter and the holding element, the first subchamber is separated from the second subchamber by the sealing element. In such a case, the sealing device serves as a further protective measure against leaks. As an alternative, the sealing device can be designed as a labyrinth seal.

As a further preference, the filter and the fuel pump can be arranged in series on a common line. As a further preference, the intermediate component and the holding element can also be arranged on the same common line. The common line preferably corresponds to a central axis of the fuel pump. Thus, a compact construction and short flow distance are possible.

It can furthermore be advantageous if the intermediate component is of substantially pot-shaped design, wherein the first opening and the second opening are arranged in a bottom of the intermediate component, and wherein the intermediate component is in flow connection with the filter via the first opening, and the filter is in flow connection with the inlet of the fuel pump via the second opening. The fuel tank preferably has a fuel tank opening, via which the fuel tank communicates with the intermediate component.

The fuel pump assembly can furthermore advantageously comprise a check valve, which is arranged at the first opening of the intermediate component. Thus, the filter can be exchanged at any time without first having to empty the fuel tank.

BRIEF DESCRIPTION OF THE DRAWING

A preferred illustrative embodiment of the invention is described in detail below with reference to the accompanying drawing, in which:

FIG. 1 is a greatly simplified schematic sectional view of a fuel pump assembly according to a preferred illustrative embodiment of the present invention.

DETAILED DESCRIPTION

A fuel pump assembly 1 according to a preferred illustrative embodiment of the present invention is described in detail below with reference to FIG. 1.

As can be seen from FIG. 1, the fuel pump assembly 1 comprises a fuel pump 2, a fuel tank 3, in which the fuel pump 2 is partially arranged, an intermediate component 4 and a filter 6.

The intermediate component 4 is arranged on the outside of the fuel tank 3 and is in flow connection with the fuel tank 3 via a fuel tank opening 31. The filter 5 is arranged in a filter chamber 6 on the outside of the intermediate component 4. Thus, a fuel flow flows from an interior 30 of the fuel tank 3 through a first opening 40 of the intermediate component 4 outward into the filter chamber 6 and from the filter chamber 6 through the filter 5, a filter opening 50 and through a second opening 41 of the intermediate component 4 to an inlet 20 of the fuel pump 2 (arrows A). From there, the fuel is pumped onward by the fuel pump 2 (arrow B).

In this illustrative embodiment, the fuel tank 3 and the intermediate component 4 are designed as separate components. As an alternative, the intermediate component 4 can be integrated with the fuel tank 3.

The intermediate component 4 is of substantially pot-shaped design, wherein the first opening 40 and the second opening 41 are arranged adjacent to one another in a bottom of the intermediate component 4. The intermediate component is in flow connection via the first opening 40 with the filter chamber 6, which is in flow connection via the second opening 41 with the inlet 20 of the fuel pump 2. At the first opening 40, a check valve 12 is provided, which is shown in an open state in FIG. 1. The fuel tank 3 has a fuel tank opening 31, via which the fuel tank 3 communicates with the intermediate component 4.

The fuel pump assembly 1 furthermore comprises a holding element 7, wherein the filter 5 is held exchangeably on the intermediate component 4 by the holding element 7. The holding element 7 is fastened detachably on the intermediate component 4 by a latching connection 8. In particular, the latching connection 8 has a latching hook 80, which engages in a groove 81 formed around the outer circumference of the intermediate component.

The holding element 7, which defines the filter chamber 6, is likewise of pot-shaped design. Moreover, the holding element 7 comprises a wall region 70 and a bottom region 71, on which the filter 5 is arranged. Furthermore, the holding element 7 has a sealing device 11. The sealing device has an intermediate wall region 72, which is of encircling design and is spaced apart from the wall region 70. The intermediate wall region 72 divides the filter chamber 6 into a first subchamber 60 and a second subchamber 61, wherein the second subchamber 61 has an annular cross section. The first subchamber 60, in which the filter 5 is situated, is of larger design than the second subchamber 61.

Furthermore, a first sealing element 9 is provided between the intermediate component 4 and the filter 6. The sealing element 9 prevents already filtered fuel from reentering the filter chamber 6. In order, together with the sealing device 11, to ensure leaktightness against fuel leaks to the outside, a second sealing element 10 is furthermore arranged between the intermediate component 4 and the holding element 7. By means of the second sealing element 10, the first subchamber 60 of the filter chamber 6 is separated from the second subchamber 61. Sealing element 9 and sealing element 10 are designed as O-rings.

The filter 5 and the fuel pump 2 are arranged in series on a common line M, which corresponds to a center line of the fuel pump 2. The intermediate component 4 and the holding element 7 are furthermore likewise arranged on the common line M. Thus, a compact construction of the fuel pump assembly 1 and a short flow distance of the fuel from the interior 30 of the fuel tank 3 to the fuel pump 2 are possible.

The fuel pump assembly 1 according to the invention significantly reduces the effort involved in fitting and removal and hence the corresponding costs for exchanging the filter 5.

The invention claimed is:

1. A fuel pump assembly, comprising:
   a fuel pump (2),
   a fuel tank (3), in which the fuel pump (2) is at least partially arranged,
   an intermediate component (4), which is arranged on an outside of the fuel tank (3) and has a fuel connection to the fuel tank (3),
   a filter (5), which is arranged in a filter chamber (6) and is arranged on an outside of the intermediate component (4) or the fuel pump (2), and
   a holding element (7), wherein the filter (5) is held exchangeably on the intermediate component (4) by the holding element (7), and the holding element (7) defines the filter chamber (6),
   wherein fuel flow flows from an interior (30) of the fuel tank (3) through a first opening (40) of the intermediate component (4) outward into the filter chamber (6) and from the filter chamber (6) through the filter (5) and through a second opening (41) of the intermediate component (4) to an inlet (20) of the fuel pump (2), wherein the filter (5) and the fuel pump (2) are arranged in series on a common axis (M), wherein the axis extends through the fuel tank, the holding element, and the intermediate component, and wherein a portion of the fuel pump is at least partially surrounded by the intermediate component, the intermediate component is at least partially surrounded by the holding element, and the filter is at least partially surrounded by the holding element.

2. The fuel pump assembly as claimed in claim 1, wherein the fuel tank (3) and the intermediate component (4) are of integral design.

3. The fuel pump assembly as claimed in claim 2, further comprising a holding element (7), wherein the filter (5) is held exchangeably on the intermediate component (4) by the holding element (7), and the holding element (7) defines the filter chamber (6).

4. The fuel pump assembly as claimed in claim 3, wherein the holding element (7) is of pot-shaped design.

5. The fuel pump assembly as claimed in claim 4, further comprising a detachable connection (8) between the holding element (7) and the intermediate component (4).

6. The fuel pump assembly as claimed in claim 5, wherein a first sealing element (9) is arranged between the filter (5) and the intermediate component (4).

7. The fuel pump assembly as claimed in claim 6, wherein a second sealing element (10) is arranged between the intermediate component (4) and the holding element (7).

8. The fuel pump assembly as claimed in claim 7, wherein the holding element (7) has a sealing device (11).

9. The fuel pump assembly as claimed in claim 1, wherein the holding element (7) is of pot-shaped design.

10. The fuel pump assembly as claimed in claim 1, further comprising a detachable connection (8) between the holding element (7) and the intermediate component (4).

11. The fuel pump assembly as claimed in claim 1, wherein a first sealing element (9) is arranged between the filter (5) and the intermediate component (4).

12. The fuel pump assembly as claimed in claim 1, wherein a second sealing element (10) is arranged between the intermediate component (4) and the holding element (7).

13. The fuel pump assembly as claimed in claim 1, wherein the holding element (7) has a sealing device (11).

14. The fuel pump assembly as claimed in claim 1, further comprising a check valve (12), which is arranged at the first opening (40) of the intermediate component (4).

15. The fuel pump assembly as claimed in claim 1, further comprising a detachable latching connection between the holding element (7) and the intermediate component (4).

16. The fuel pump assembly as claimed in claim 1, further comprising a check valve (12), which is arranged at the first opening (40) of the intermediate component (4).

17. The fuel pump assembly as claimed in claim 1, wherein the axis is a central axis of the fuel pump, the intermediate component, the holding element, and the filter.

* * * * *

UNITED STATES PATENT AND TRADEMARK OFFICE
CERTIFICATE OF CORRECTION

PATENT NO. : 10,508,630 B2
APPLICATION NO. : 15/534020
DATED : December 17, 2019
INVENTOR(S) : Tamas Szabo Page 1 of 1

It is certified that error appears in the above-identified patent and that said Letters Patent is hereby corrected as shown below:

On the Title Page

Please Add:
Foreign Application Priority Data:
Dec. 9, 2014 (DE)............10 2014 225 309.8

Signed and Sealed this
Twenty-fourth Day of November, 2020

Andrei Iancu
*Director of the United States Patent and Trademark Office*